United States Patent [19]
Raber

[11] Patent Number: 6,074,450
[45] Date of Patent: Jun. 13, 2000

[54] AIR FILTER ASSEMBLY

[76] Inventor: Robert R. Raber, 7867 Avenuda Navidad Apt. 254, San Diego, Calif. 92122

[21] Appl. No.: 08/950,336

[22] Filed: Oct. 14, 1997

Related U.S. Application Data

[60] Provisional application No. 60/028,554, Oct. 15, 1996.

[51] Int. Cl.$^7$ ................................................. B01D 46/02
[52] U.S. Cl. ............................ 55/497; 55/499; 55/501; 55/504; 55/521
[58] Field of Search ........................... 55/497, 499, 501, 55/504, 508, 511, 521

[56] References Cited

U.S. PATENT DOCUMENTS

| | | | |
|---|---|---|---|
| 2,013,038 | 9/1935 | Dollinger | 55/501 |
| 2,071,806 | 2/1937 | Walker | 55/499 |
| 2,135,863 | 11/1938 | Walker | 55/499 |
| 2,739,667 | 3/1956 | Palmore | 55/499 |
| 3,138,443 | 6/1964 | Engle et al. | 55/499 |
| 3,941,571 | 3/1976 | Getzin | 55/501 |
| 4,177,050 | 12/1979 | Culbert . | |
| 4,272,267 | 6/1981 | Kamps et al. | 55/499 |
| 4,455,823 | 6/1984 | Bly et al. | 55/499 |
| 4,547,950 | 10/1985 | Thompson | 55/499 |
| 5,140,086 | 8/1992 | Hunter et al. . | |
| 5,472,467 | 12/1995 | Pfeffer . | |
| 5,531,892 | 7/1996 | Duffy | 55/501 |
| 5,558,689 | 9/1996 | Yanagihara et al. | 55/501 |

*Primary Examiner*—Jay H. Woo
*Assistant Examiner*—Minh-Chau T. Pham

[57] ABSTRACT

A filter assembly for use in filtering air in an air conditioning system has a front grille through which air enters the assembly and a rear grille through which filtered air is exited. A frame is attached to the grilles, joining these grilles together to form a container structure. An air permeable filter element in the form of a pleated or undulating sheet is installed in the container structure, the opposite ends of the pleated sheet being attached to opposing sides of the frame. The pleated sheet runs between the front and rear grilles and extends from the top to the bottom of the grilles. The filter sheet has a filtering media which may be of microglass on the surface thereof which faces the front grille and a stiffened backing on the surface facing the rear grille. The filter sheet is structurally reinforced by a first set of separate fingers which are individually attached to the front grille and which extend linearly into each of the pleats facing the front grille and a second set of separate fingers which are individually attached to the rear grille and extend into each of the pleats facing the rear grille.

5 Claims, 5 Drawing Sheets

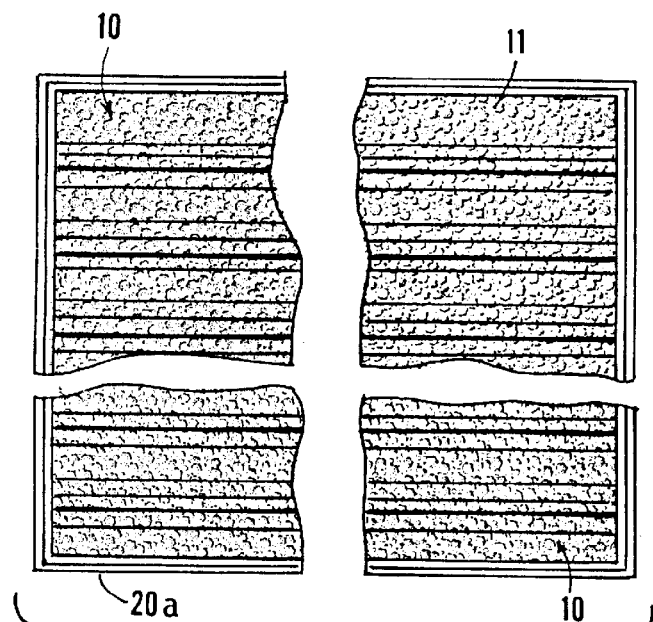
FIG. 6
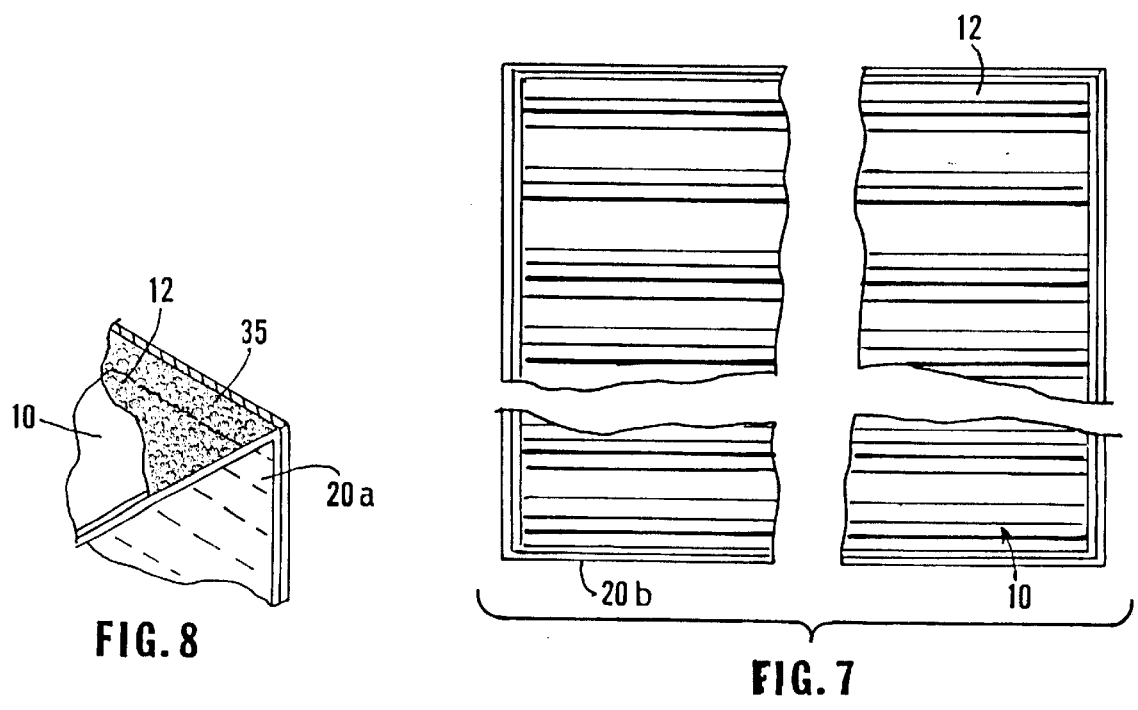
FIG. 8
FIG. 7

AIR FILTER ASSEMBLY

This application claims benefit of Provisional application Ser. No. 60/028,554 filed Oct. 25, 1996.

BACKGROUND OF THE INVENTION

1. Field of the Invention

This invention relates to air filters and more particularly to a filter assembly for use in air conditioning systems which utilizes an air permeable filter media in a pleated form.

2. Description of the Related Art

In air conditioning systems, the air filters employed must be capable of filtering out fine particles of foreign matter such as dirt particles and dust to avoid their entry into the air conditioned space. Filters capable of filtering out fine particles offer considerable resistance to the flow of air. One way of alleviating this problem is to provide a large area filtering surface by successively bending a flat filtering media back and forth on itself to form a pleated or undulated configuration. While providing the desired filtering area so as to permit adequate air flow, this pleated configuration is incapable of self support. To provide such support a wire grid may be attached to the pleated filter media, such as described in U.S. Pat. No. 4,177,050 issued Dec. 4, 1979 to Robert M. Culbert and Robert R. Raber, Jr., inventor of the present invention. The use of metal in the filter assembly makes the unit difficult to discard by incineration, which is the manner such units are generally disposed of when discarded. Metal remaining in the incinerated debris could constitute an environmental hazard which the Environmental Protection Agency could require removal of, at great expense to the user.

In the system described in the aforementioned '050 patent, additional support for the pleated filter element is provided in the form of spine or web structures from which a plurality of finger portions extend into the pleats. This unitary structure for providing support for the pleats has the disadvantage of adding additional weight to the unit. Further, if any one of the fingers should be bent or otherwise damaged, it is necessary to replace the entire structure. Also, the unitary structure employed is more costly than the unitary finger elements employed in the present invention.

SUMMARY OF THE INVENTION

The device of the present invention overcomes the shortcomings of the prior art by providing a system in which wire backing for the filter element is not employed but rather a stiff permeable backing is provided for the filters. In providing support for the pleated filter element employed a plurality of individual non-metallic fingers, which are individually supported on the grille, are utilized. The filter element is formed from a continuous air laid filter media which may be of microglass to which a non metallic backing is attached to form an integral unit, the backing providing structural support against the aerodynamic forces encountered. This filter element further includes a special cellulosic board impregnated for water resistance which is sandwiched between a thin aluminum foil exterior for water repellency and a thicker aluminum foil interior which serves as a heat shield.

The filter element is formed into a pleated or undulated structure by folding a sheet of the element material back on itself in opposite directions. This pleated element is mounted in a container formed by front and rear similar grille elements which are joined together by a frame element. The top and bottom ends of the pleated element are attached to the top and bottom portions of the frame respectively with the side of the filter element having the filter media formed thereon facing the front grille element. As previously noted, support for the pleated sections of the filter element is provided by a plurality of individual non-metallic finger elements extending from a thin strips which are attached to the grille elements. First sets of these finger elements are mounted in a line on the front grille element, each finger extending between one of the pleats of the filter element. Second sets of fingers which are substantially longer than the first sets are mounted in similar fashion on the rear grille element, with each finger extending between a pleat at the rear of the filter element. The front and rear sets of fingers overlap to provide good support for the pleats. Thus support is provided for the filter element both by its backing and by the individual fingers extending from the grille elements.

It is therefore an object of this invention to provide an improved support for a flexible air laid filter media in an air filter.

It is a further object of this invention to provide a lightweight non metallic air filter which can be readily incinerated and more easily carried by maintenance personnel.

Other objects of the invention will become apparent in view of the following description taken in connection with the accompanying drawings.

DESCRIPTION OF THE DRAWINGS

FIG. 6 is a front elevational view of the preferred embodiment with the front grille removed;

FIG. 7 is a rear elevational view of the preferred embodiment with the rear grille removed;

FIG. 8 is a sectional perspective view illustrating the attachment of the pads made of the filter media to the inner walls of the frame in the preferred embodiment;

DETAILED DESCRIPTION OF THE INVENTION

Referring now to the FIGS., filter element 10 is formed from a filtering media 11 on one side and a stiff support backing 12 on the other side. The support backing 12 must offer relatively low resistance to air flow. It has been found that such a backing having a Frazier permeability of 300 or higher and having a Gurley stiffness of 3000 mg Cross Machine and 5000 mg Machine direction or higher will function satisfactorily. A filter element such as described in U.S. Pat. No. 5,472,467 issued Dec. 5, 1995 to Pfeffer will perform adequately.

The filter element 10 may be formed from a single sheet of filter material which is folded back and forth on itself to form a pleated or undulated shape, as shown in the Figures.

Figure 4:
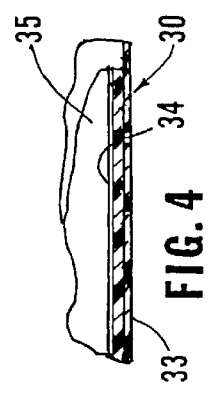
FIG. 4 is a cross-sectional view illustrating the attachment of the pad made of the filter media to the inner wall of the frame in the preferred embodiment.
Figure 9:
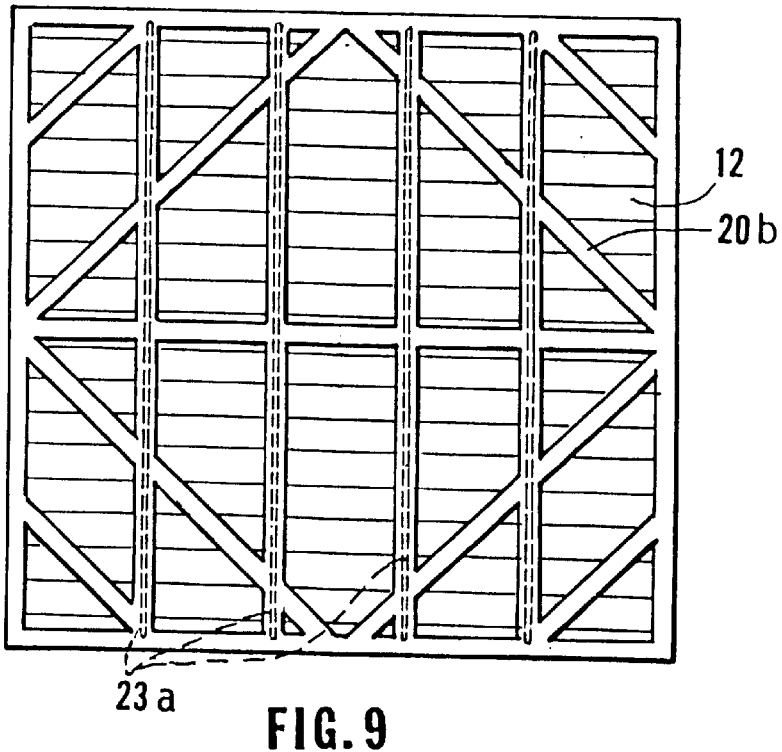
FIG. 9 is a rear elevational view of the preferred embodiment.
Figure 10:
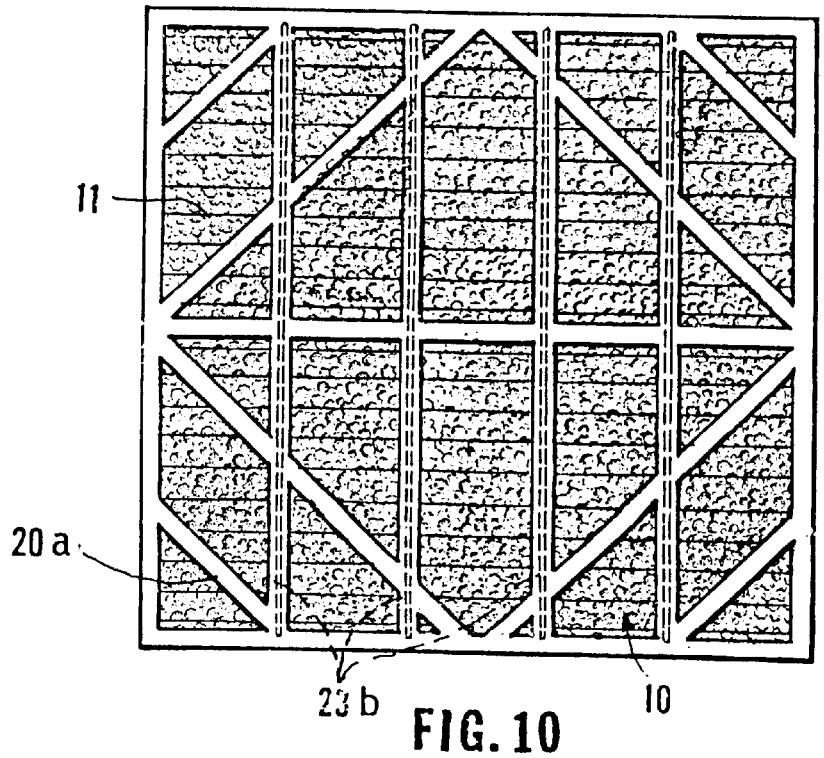
FIG. 10 is a front elevational view of the preferred embodiment.
Figure 11:
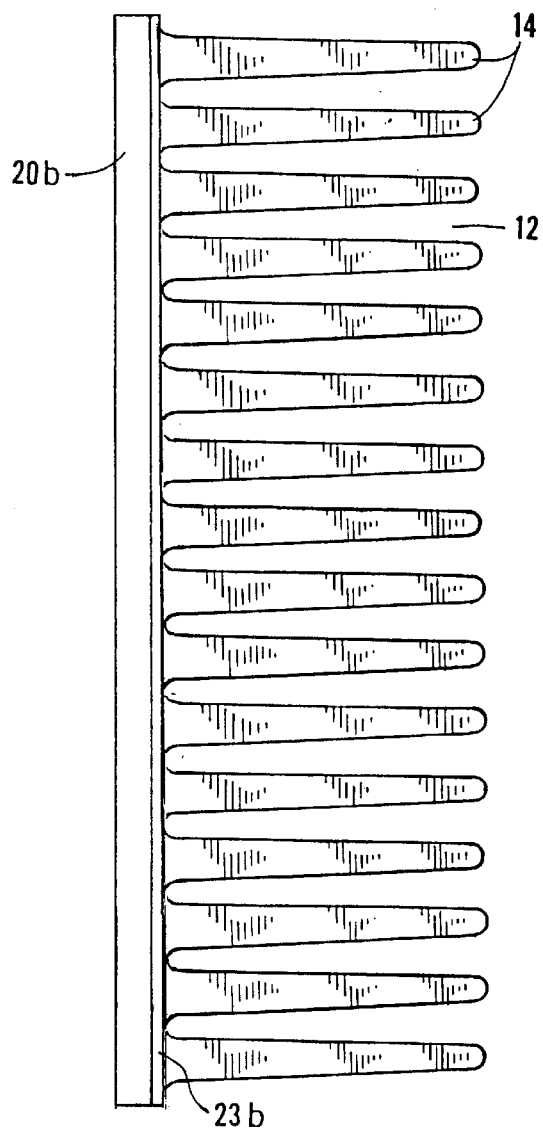
FIGS. 11A and 11B are side elevational views showing the fingers removed from the frame in the preferred embodiment.
Figure 11:
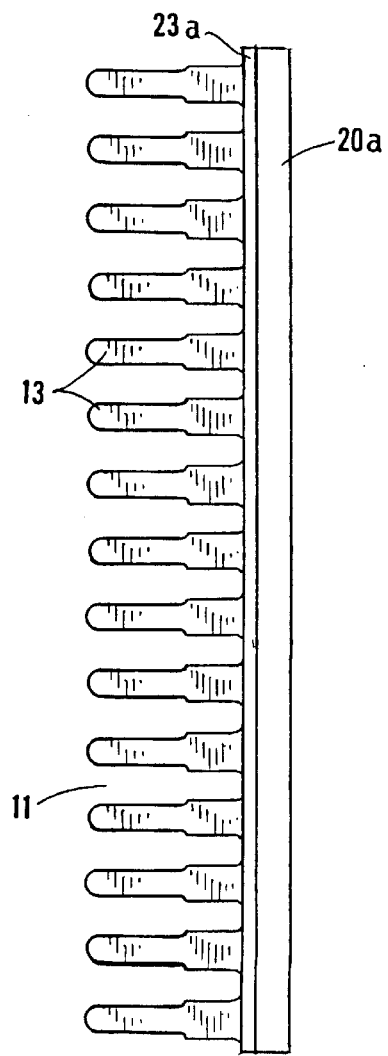

The filter element 10 is mounted in a container formed by opposing front and rear grille elements 20a and 20b which are joined together by frame 30. As shown in FIG. 4, the frame 30 may be fabricated of a chip board laminate consisting of an outer 0.00035" moisture barrier, a decorative laminate and a hard-sized bending chip board core 33, grain short for additional resistance to compressive loads. Also a 0.005" inner aluminum foil heat shield 34 is employed. The opposite ends of the pleated filter element are glued to the upper and lower opposing walls of frame 30. This is accomplished by gluing a 0.5" thick microglass media pad 35 to the interior surface 34 of the frame, this to prevent by-pass leakage, and then in turn gluing the ends of the filter element to pad 35 as shown in FIG. 5.

Structural containment of the enclosing frame 30 is provided by inserting and enclosing the edges of the frame into grooves in the face grille elements 20a and 20b and then securing the frame to the grille elements by means of staples 40.

Fingers 13 and 14 are secured to the grille elements 20a and 20b, extending linearly from the top to the bottom thereof. First sets of such fingers 13 are installed in the front grille element 20a in slots 23a while second sets of such fingers are installed in the rear grille element 20b. The fingers are positioned so that each finger extends between a separate one of the pleats of the filter element. Fingers 14 are substantially longer than fingers 13 so that the fingers overlap. FIG. 12a shows the second sets of fingers 14 removed from their installed position between the pleats while FIG. 12b shows the first sets of fingers 13 removed from their installed position.

Figure 1:
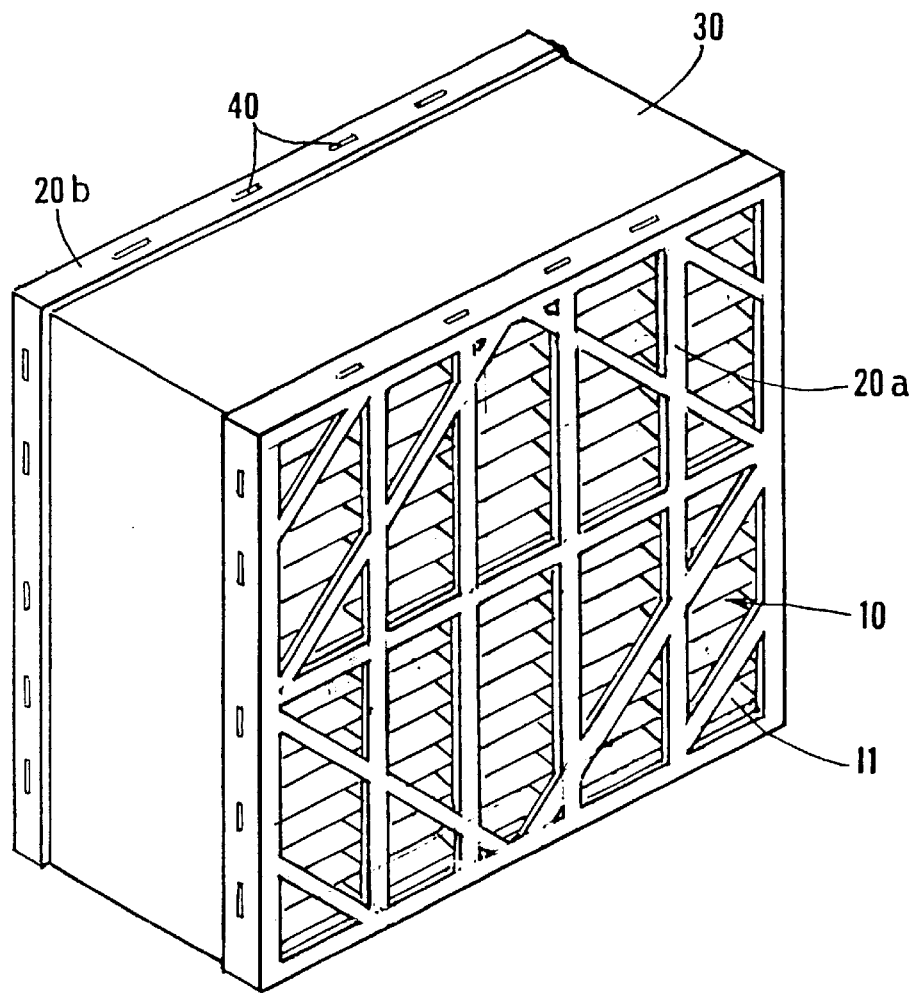
FIG. 1 is a front top perspective view of a preferred embodiment of the device of the invention.
Figure 2:
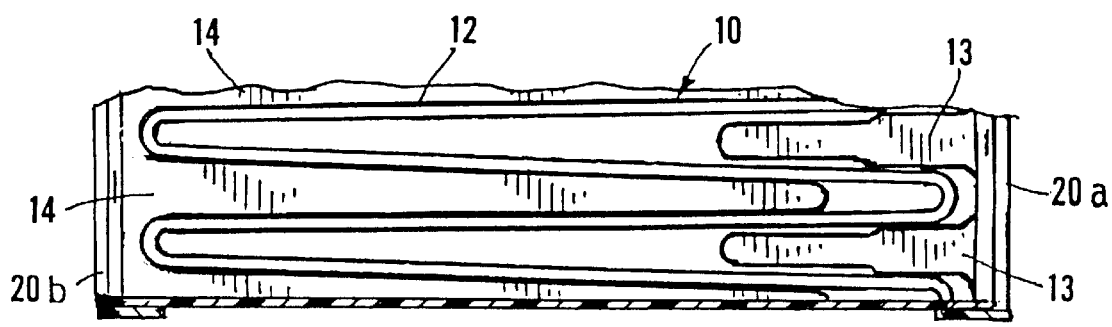
FIG. 2 is a vertical cross-sectional view illustrating the internal structure of the preferred embodiment.
Figure 3:
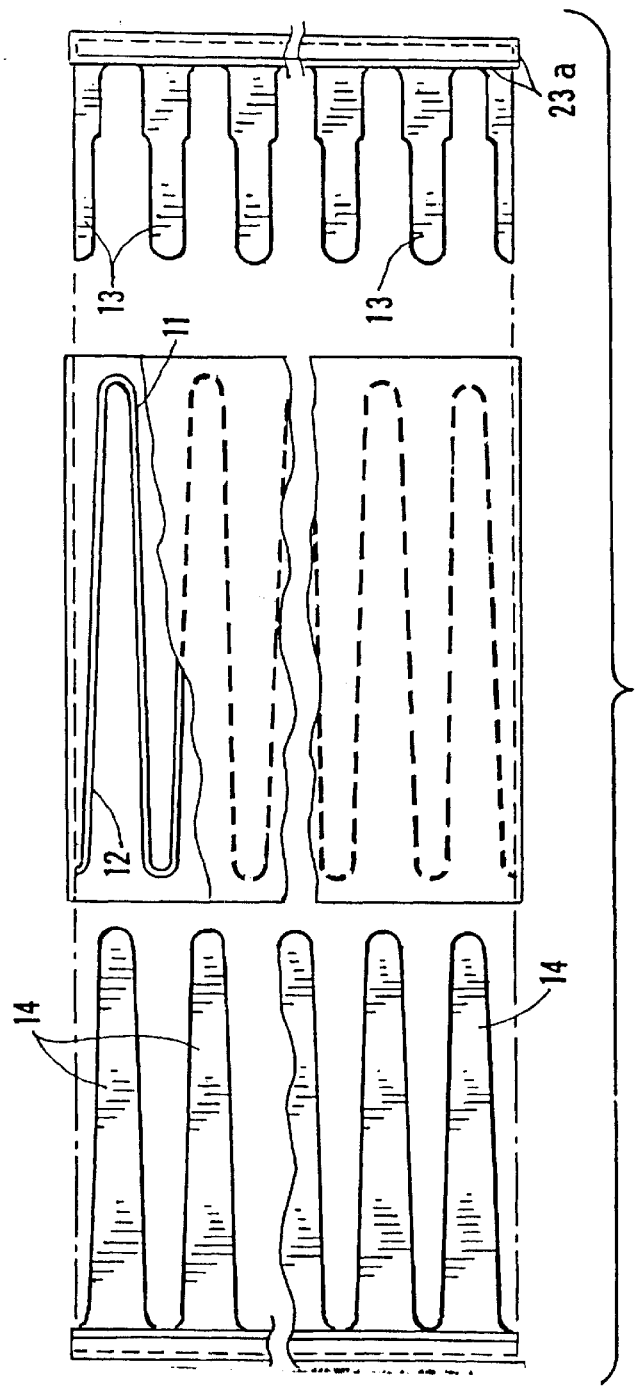
FIG. 3 is an exploded view of the preferred embodiment showing the fingers removed therefrom.
Figure 5:
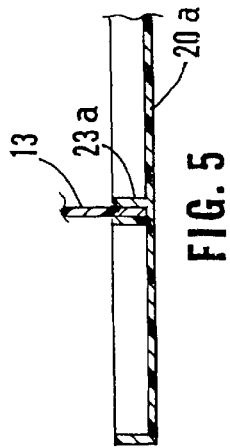
FIG. 5 is a cross-sectional view illustrating the attachment of the fingers to the grilles in the preferred embodiment.

Fingers 13 and 14 are each attached to their associated grille elements as shown in FIG. 5. Grooves 23a and 23b are provided in the vertical sections of each of the grilles, and strips 13a and 14a from which the fingers extend are installed in separate grooves with each finger at the proper position for entering one of the pleats. When installed in the proper position, the strips are stapled in place.

Grille elements 20a and 20b may be fabricated of polypropylene plastic while the fingers 13 and 14 may be fabricated of a moisture and fungicide treated board such as described in U.S. Pat. No. 5,140,086 issued Aug. 18, 1992 to Hunter et al.

While the invention has been described and illustrated in detail, this is intended by way of illustration and example only, the scope of the invention being limited by the terms of the following claims.

I claim:

1. An air filter comprising:

front and rear grilles, a frame attached to said front and rear grilles, joining said grilles together to form a container structure therewith, an air permeable filter element in the form of a pleated sheet attached at opposite ends to opposing sides of said frame, said pleated sheet running between said front and rear grilles over substantially the entire extent of said grilles, said filter element having one side which forms a permeable stiff backing which provides support for said filter element and an opposite side which forms an air filter, a first set of individual separate fingers, each of said fingers being attached to the inner wall of said front grille, said fingers being spaced from each other there along such that each of said fingers fits into a separate one of the pleats on one side of said filter element, and a second set of individual separate fingers, each of said fingers being separately attached to the inner wall of said rear grille, said fingers being spaced from each other there along such that each of the fingers of said second set fits into a separate one of the pleats on the side of said filter element opposite to said one side thereof.

2. The air filter of claim 1 and further including means for attaching said fingers to said grilles comprising grooved portions formed in said grilles and means for attaching said fingers to said grooved portions.

3. The air filter of claim 2 wherein said means for attaching said fingers to said grooved portions comprises elongated strips from which said fingers extend, said strips being fitted in said grooved portions and means for retaining said strips in said grooved portions.

4. The air filter of claim 1 wherein said fingers are linearly aligned with each other.

5. The air filter of claim 1 wherein the fingers of said second set are substantially longer than the fingers of said first set, said first and second set of fingers being in overlapping relationship.

* * * * *